(12) United States Patent
Raybon et al.

(10) Patent No.: US 8,069,972 B2
(45) Date of Patent: Dec. 6, 2011

(54) BOARD LUMBER POSITIONING FENCE

(75) Inventors: Chris Raybon, Hot Springs, AR (US); Russell Kennedy, Hot Springs, AR (US); Pat Conry, Hot Springs, AR (US); Thomas Wayne Green, Hot Springs, AR (US)

(73) Assignee: Baxley Equipment Co., Hot Springs, AR (US)

( * ) Notice: Subject to any disclaimer, the term of this patent is extended or adjusted under 35 U.S.C. 154(b) by 86 days.

(21) Appl. No.: 12/781,845

(22) Filed: May 18, 2010

(65) Prior Publication Data

US 2010/0300833 A1 Dec. 2, 2010

Related U.S. Application Data

(60) Provisional application No. 61/180,988, filed on May 26, 2009, provisional application No. 61/302,564, filed on Feb. 9, 2010.

(51) Int. Cl.
*B65G 47/34* (2006.01)

(52) U.S. Cl. .................. 198/597; 198/456; 198/457.01

(58) Field of Classification Search ............ 198/370.02, 198/370.07, 370.08, 456, 457.01, 457.06, 198/457.07, 597

See application file for complete search history.

(56) References Cited

U.S. PATENT DOCUMENTS

| | | | | |
|---|---|---|---|---|
| 5,911,302 A * | 6/1999 | Jackson | ......................... | 198/456 |
| 6,382,067 B1 * | 5/2002 | Gagnon | ......................... | 83/732 |
| 6,607,068 B1 * | 8/2003 | Walther et al. | ................ | 198/456 |
| 6,892,614 B2 * | 5/2005 | Olsen | ................................ | 83/27 |
| 7,419,047 B2 | 9/2008 | Cesselli | | |
| 7,690,497 B2 * | 4/2010 | Radwallner et al. | ..... | 198/457.03 |
| 7,779,986 B2 * | 8/2010 | Enomoto | ................ | 198/370.02 |
| 2004/0104098 A1 * | 6/2004 | Cassoli et al. | ........... | 198/370.07 |
| 2004/0163930 A1 * | 8/2004 | Work | ............................ | 198/456 |

FOREIGN PATENT DOCUMENTS

| | | |
|---|---|---|
| CA | 2191390 | 5/1997 |
| CA | 2236508 | 11/1999 |
| CA | 2241481 | 12/1999 |
| CA | 2345872 | 10/2002 |

\* cited by examiner

*Primary Examiner* — Mark A Deuble

(74) *Attorney, Agent, or Firm* — Jeffrey S. Melcher; Manelli Selter PLLC (57) ABSTRACT

Provided is a positioning fence for use in lumber sawmills that facilitates automated positioning of lumber for cutting and a method of positioning lumber for cutting. A continuous moving track loop has a plurality of paddles laterally positionable across the width of the track. Electromagnets are used to control the position of the paddles and, thus, the position of lumber being transported by the paddles. Also provided are uses of the positioning fence to position lumber for cutting.

29 Claims, 7 Drawing Sheets

BOARD LUMBER POSITIONING FENCE

This application claims priority to U.S. Provisional Patent Application Ser. Nos. 61/180,988, filed 26 May 2009, and 61/302,564, filed 9 Feb. 2010, the complete disclosures of which are incorporated herein by reference.

FIELD OF THE INVENTIONS

The inventions relate to positioning fences for lumber or timber in sawmills or planermills and methods of using the positioning fences.

BACKGROUND OF THE INVENTIONS

In sawmills, various lumber or timber handling machinery is provided to cut and shape the lumber or timber into saleable wood products. One of the required operations in a mill, after sawing or forming to the desired cross section, is end trimming individual boards or timbers to a specified length.

To cut the material to length, a typical arrangement of transport equipment has a conveyor that has a lug chain table to transport the lumber pieces to length cutting saws. The lumber pieces are carried along the conveyor in equidistantly spaced succession based on the lug spacing of the lug chains. The conveyor has a set of lateral alignment rollers. The lateral alignment rollers form a roller bed system placed at right angles to the lug chain, which operate to urge one end of the lumber material toward a stop or fence, also referred to as a paddle. In this arrangement, each successive piece of lumber is spaced from the other in the direction of travel along the lumber conveyor by the lugs of the lug chain and one of the ends of the lumber is laterally aligned to the stop or fence.

The piece to be cut to length is positioned for contact with a saw or series of saws. In the configuration of sawmill conveyor equipment just described, the saws are stationary relative to the conveyor and the board is laterally positioned on the conveyor relative to the saw blade. A positioning fence, which one end of the lumber piece abuts against, controls the lateral position of the lumber piece on the feed conveyor. Numerous prior art arrangements for adjustable positioning fences for use with such a feed conveyor arrangement have been proposed in the past. For example a step positioning fence is disclosed in the published Canadian Patent application 2,241,481 of Wight et al. The stepped positioning fence of Wight has a plurality of rigid elevated faces, or steps that extend longitudinally along a side of the fence in an adjacent stepped array of differing offset spacing. The fence is oriented to present one of the steps for contact with the lumber piece to align the lumber end to the corresponding offset of that step. The lumber is urged into contact with the fence by the lateral alignment rollers resulting in alignment of the lumber end to the fence step offset. The stepped fence provides fixed incremental ending settings and a positioning mechanism to ensure the board is presented with a step suitable to obtain the desired or intended lateral translation of the board piece.

Another flexible trimmer position fence is disclosed in Canadian Patent 2,191,390 to Jackson, which discloses a board positioning fence comprised of a plurality of adjustable fence elements each staged one after the other in the downstream direction of travel of the lumber to be positioned. The lumber is urged against the positioning fence by lateral alignment or ending rollers. The ending rollers urge the lumber laterally across the feed conveyor into contact with the successive fence elements of the board positioning fence. When the desired lateral positioning of the board is achieved, lift skids are engaged to remove the lumber from contact with the lateral urging end rollers. This arrangement has multiple flexible fence elements, which are adjusted to allow the board to be ended to the desired positioning or ending location. Once the board has been displaced laterally to the desired position offset, skids are engaged that lift the positioned lumber piece away from the ending rollers.

Another arrangement to provide board lumber end positioning is disclosed in the Canadian patent 2,236,508 of Hannebauer et al. Hannebauer discloses a circulating paddle positioning fence with a flexible guide track. Actuators position the flexible guide track, which results in corresponding positioning of a paddle to a desired offset or ending position.

And yet another positioning mechanism is disclosed in the published Canadian Patent application 2,345,872 of Jobin, for apparatus for positioning pieces of wood for precise cutting. Jobin discloses an adjustable barrier, which is provided with actuators to position the barrier to the desired offset location. Various forms of adjustable barriers are shown including ones which have a face that remains perpendicular to the board as well as providing for incline planes that have a set displacement selected by an actuator to achieve an ending or offset of the lumber laterally to the desired offset amount.

A further positioning mechanism is disclosed in U.S. Pat. No. 7,419,047. This patent discloses a continuous moving track loop having a plurality of paddles laterally positionable across the width of the track. Complex mechanical brake mechanisms, positioning cams and reset cams are used to position the paddles.

There is a need for a simplified board positioning mechanism that positions accurately, does not operate via cylinders, compressed air or hydraulics and is resistant to wear.

SUMMARY OF THE INVENTION

The invention relates to an apparatus for positioning a lumber piece comprising:
- a continuous track loop;
- a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber in a desired position perpendicular to a longitudinal direction of the track loop during use;
- the at least one paddle having a locking mechanism constructed and arranged to lock the lateral position of the at least one paddle on the bearing way, the locking mechanism being biased in a closed position and being constructed such that when the locking mechanism is in a closed position the paddle is locked in position on the bearing way;
- an actuator disposed at an angle across the width of the track, the actuator constructed and arranged such that when activated the locking mechanism is in an open position and the paddle is free to move along the length of the bearing way and when the actuator is deactivated the locking mechanism locks the position of the paddle on the bearing way; and
- a paddle roller bank disposed at an angle across the width of the track, the paddle and paddle roller bank constructed and arranged so that as the track moves during operation and the locking mechanism is in an open position the paddle moves in the direction of the track and along the paddle roller bank which moves the paddle in a direction along the bearing way from a starting position to a desired position on the bearing way, and when the actuator is deactivated the locking mechanism goes to a closed position and the paddle is in a locked position on the bearing way and movement of the track pulls the paddle away from the paddle roller bank so that the paddle then moves only in the direction of the track.

The invention also relates to an apparatus for positioning a lumber piece comprising:

a continuous track loop;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of a lumber piece and stopping the lumber in a desired position perpendicular to a longitudinal direction of the track loop during use;

the at least one paddle having a locking mechanism constructed and arranged to lock the lateral position of the at least one paddle on the bearing way, the locking mechanism comprising a movable pin biased in a closed position where a first end of the pin is against the bearing way, the pin having a pad disposed at a second end of the pin, a first surface of the pad facing away from the pin and a second surface of the pad facing the pin;

an actuator magnet bank disposed at an angle across the width of the track, the actuator magnet bank constructed and arranged such that when activated the pad on the pin is attracted to the actuator magnet bank and the pin is moved into an open position where the first end of the pin is not against the bearing way and the paddle is free to move along the length of the bearing way and when the actuator magnet bank is deactivated the first end of the pin is against the bearing way to lock the position of the paddle on the bearing way; and a paddle roller bank disposed at an angle across the width of the track, the paddle roller bank comprising a depression constructed to receive a portion of a roller ball, the paddle having a roller ball receiver containing a roller ball biased in a direction towards the depression, a portion of the roller ball disposed within the depression so that as the track moves during operation the paddle moves in the direction of the track and in the direction of the bearing way as the roller ball travels along a length of the paddle roller bank which moves the paddle from a starting position on the bearing way to a desired position on the bearing way, and when the locking mechanism is moved to a closed position, the paddle is locked, and movement of the track forces the ball to retract into roller ball receiver so that the roller ball leaves the depression and the paddle then moves only in the direction of the track.

The invention further relates to an apparatus for positioning a lumber piece comprising:

a continuous track loop;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of a lumber piece and stopping the lumber in a desired position perpendicular to a longitudinal direction of the track loop during use;

the at least one paddle having a locking mechanism constructed and arranged to lock the lateral position of the at least one paddle on the bearing way, the locking mechanism comprising a movable pin biased in a closed position, the pin having a first end that contacts the bearing way when in the closed position and a pad disposed at a second end of the pin;

an actuator magnet bank disposed at an angle across the width of the track, the actuator magnet bank constructed and arranged such that when activated the pad on the pin is attracted to the actuator magnet bank and the pin is moved into an open position where the first end of the pin does not contact the bearing way and the paddle is free to move along the length of the bearing way and when the actuator magnet bank is deactivated the first end of the pin contacts the bearing way to lock the position of the paddle on the bearing way; and a paddle roller magnet bank disposed at an angle across the width of the track, the paddle having a surface that is magnetically attracted to the paddle roller magnet bank so that as the track moves during operation the surface of the paddle is magnetically bound to the paddle roller magnet bank and travels along the paddle roller magnet bank which moves the paddle moves from a starting position to a desired position on the bearing way, and when the pin is moved to a closed position, the paddle is locked, and movement of the track overtakes the magnetic force between the paddle roller magnet bank and the surface of the paddle so that the paddle then moves only in the direction of the track.

The invention also relates to a method of positioning a lumber piece traveling on a conveyor comprising:

a continuous track loop;

a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber in a desired position perpendicular to a longitudinal direction of the track loop;

the at least one paddle having a locking mechanism constructed and arranged to lock the lateral position of the at least one paddle on the bearing way, the locking mechanism being biased in a closed position and being constructed such that when the locking mechanism is in a closed position the paddle is locked in position on the bearing way;

an actuator disposed at an angle across the width of the track, the actuator constructed and arranged such that when activated the locking mechanism is in an open position and the paddle is free to move along the length of the bearing way and when the actuator is deactivated the locking mechanism locks the position of the paddle on the bearing way; and a paddle roller bank disposed at an angle across the width of the track, the paddle and paddle roller bank constructed and arranged so that as the track moves during operation and the locking mechanism is in an open position the paddle moves in the direction of the track and along the paddle roller bank which moves the paddle in a direction along the bearing way from a starting position to a desired position on the bearing way, and when the actuator is deactivated the locking mechanism goes to a closed position and the paddle is in a locked position on the bearing way and movement of the track pulls the paddle away from the paddle roller track so that the paddle then moves only in the direction of the track, the method comprising:

transporting a piece of lumber with the lumber contacting the paddle;

moving the lumber in a direction perpendicular to the travel of the track until a desired position of the lumber is reached;

switching the locking mechanism to a closed position when the desired position of the lumber is reached which locks the paddle in place on the bearing way and stops further movement of the lumber in the direction perpendicular to the travel of the track;

separating the paddle from the paddle roller bank by continuing to move the track while the paddle is in a locked position on the bearing way so that the lumber only travels in the direction of the track; and returning the paddle to a starting position.

DETAILED DESCRIPTION

The inventions will now be explained with reference to the non-limiting FIGs.

Figure 1:
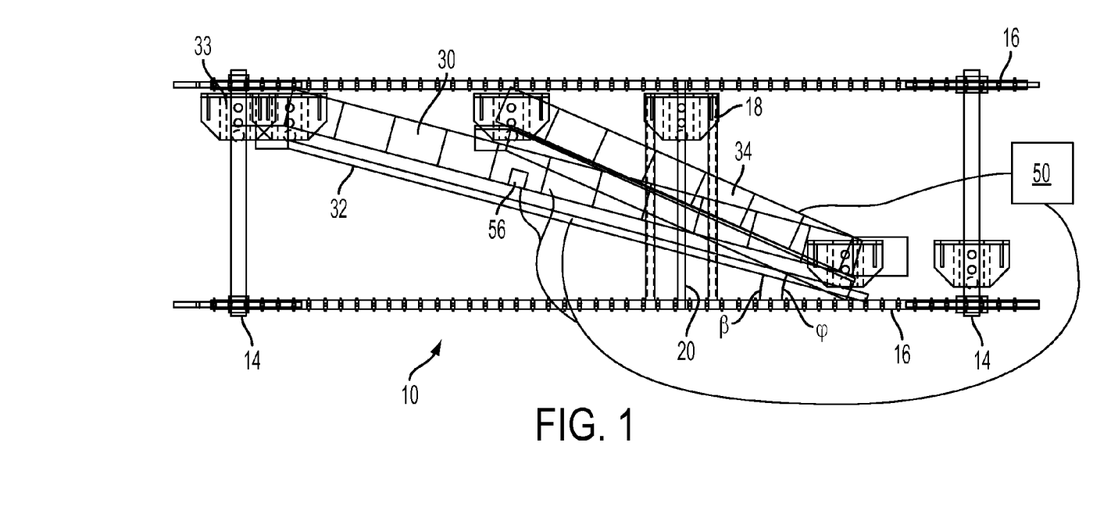
FIG. 1 is a top view of an embodiment of the positioning fence.
Figure 2:
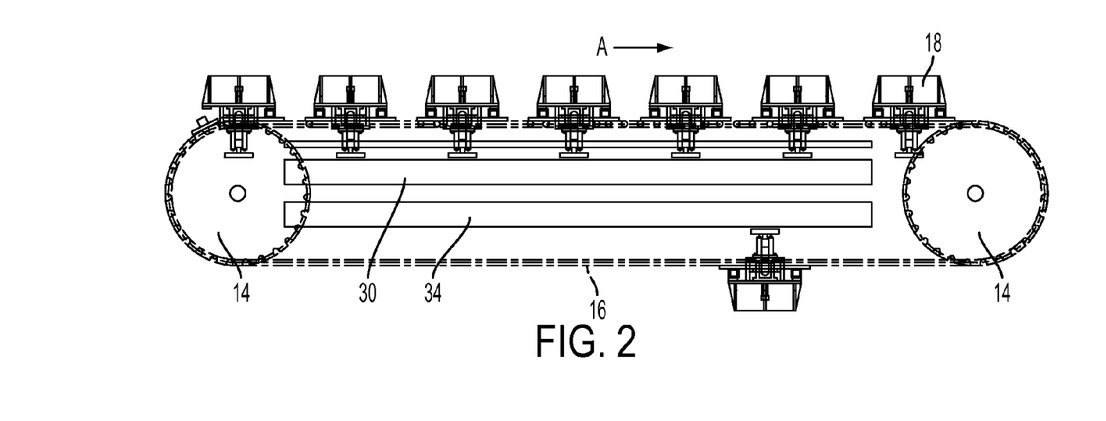
FIG. 2 is a side view of the positioning fence of FIG. 1.

FIGS. 1 and 2 show an embodiment of the positioning fence of the present inventions, generally depicted by reference numeral 10. The positioning fence has a continuous track 16 extending between an opposed set of end rollers 14. The width of the track 16 is generally about 3 feet, but any desired width can be used. The top of the track 16 moves in a left to right direction, as shown by the arrow A. The track 16 includes a plurality of paddles 18 spaced along the continuous track 16 corresponding to the lumber spacing of the individual lumber pieces that the lumber position fence will be used to position. The paddles 18 have a surface 19 for interacting with the lumber pieces as shown in FIG. 3.

At least one of end rollers 14 is driven to cause the track 16 and the paddles 18 to move in a longitudinal direction, that is in the direction of travel of the lumber, which is generally depicted by arrow A. End roller 14 can be driven by and in time with the lumber conveyor or by a separate drive that follows the movement of the lumber coveyor exactly. At least one of the paddles 18 is mounted for lateral sliding movement across the width of the track loop along a bearing way 20. The bearing way 20 is oriented for lateral movement of the paddle 18, which is a direction perpendicular to the longitudinal direction of the track 16.

Figure 3:
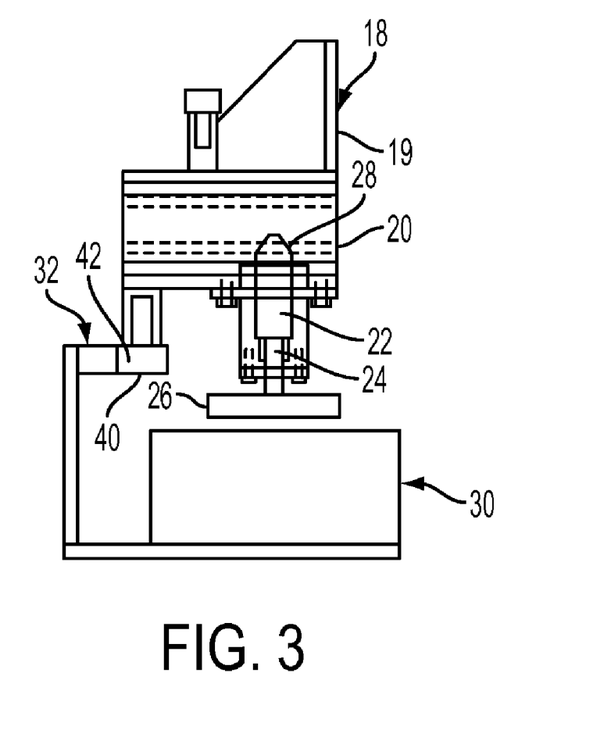
FIG. 3 is a side view of a paddle, an actuator magnet bank, and a paddle roller magnet bank.

FIG. 3 shows a side view of a paddle 18 mounted on a bearing way 20. The paddle 18 having a locking mechanism constructed and arranged to lock the lateral position of the at least one paddle. The locking mechanism comprises a movable pin 22 biased in a closed position by a spring 24. The pin 22 has a pad 26 that is attracted to a magnetic source. The bearing way 20 has a plurality of detents 28 along a length of the bearing way sized to receive the pin 22 when in the closed position. Preferably, the detents 28 are located about 0.1 to 3 inches apart, more preferably about 0.2 to about 1 inch apart, and most preferably about 0.5 inch apart.

As shown in FIGS. 1-3, an actuator magnet bank 30 is disposed at an angle β across the width of the track 16. The actuator magnet bank 30 comprises at least one electromagnet that can be activated and deactivated. The actuator magnet bank 30 is constructed and arranged such that when activated, the pad 26 is magnetically attracted to the actuator magnet bank 30 and the pin 22 moves to an open position where the end of the pin 22 is not inserted in the detent 28 on the bearing way 20. When the pin 22 is an open position, the paddle 18 is free to move along the length of the bearing way 20. When the actuator magnet bank 30 is deactivated the end of the pin 20 is inserted in the detent 28 on the bearing way by the spring 24 to lock the position of the paddle 18 on the bearing way 20. While a linear actuator magnet bank 30 is shown, a non-linear actuator magnet bank 30 can be used if desired. The angle β of the actuator bank 30 can be as desired for the particular application. In general, the greater the angle β the faster the paddle 18 will travel along the bearing way 20 as the track 16 moves. When using a linear track, examples of suitable angles β are from 1 to 80 degrees, preferably from 5 to 60 degrees, more preferably about 10 to about 35 degrees.

A paddle roller magnet bank 32 is disposed at an angle β across the width of the track 16. The paddle roller magnet bank 32 can comprise a permanent magnet and/or an electromagnet. The paddle 18 has a metal surface 40 that is magnetically attracted to the paddle roller magnet bank 32. Thus, when the track 16 is moving in the left to right direction shown in FIGS. 1-2, the metal surface 40 is magnetically bound to the paddle roller magnet bank 32 and moves the paddle 18 from a starting position shown at 33 along the bearing way 20 while the actuator magnet bank 30 is activated and the pin 22 is in the unlocked position. When a desired position of the paddle 18 on the bearing way 20 is obtained, the actuator magnet bank 30 is deactivated and the pin 22 is inserted in a detent 28, the paddle 18 is locked, and as the track 16 continues to move the metal surface 40 is pulled away from the paddle roller magnet bank 32 and the paddle 18 continues to move in the direction of the track 16. Preferably, the paddle roller magnet bank 32 and the actuator magnet bank 30 have the same angle β. When a magnet bank 30 is used having a length in which more than one paddle 18 will be traveling along the length at a time, the magnet bank 30 comprises a plurality of electromagnets and the individual electromagnets can be activated and deactivated independently of one another to separately control each paddle 18 location.

A paddle reset slide 34 is disposed at an angle φ across the track 16. The paddle reset slide 34 is constructed and arranged to move the paddles 18 back into the starting position 33. The paddle reset slide 34 can comprise a magnet bank or other means for moving the pin 22 into an open position and sliding the paddle 18 back to the starting position. The angle φ can be as desired for the particular application. In general, the greater the angle φ the faster the paddle 18 will travel along the bearing way 20 as the track 16 moves. Examples of suitable angles φ are from 1 to 80 degrees, preferably from 5 to 60 degrees, and more preferably about 10 to about 35 degrees.

The detents 28 can be, for example, holes, depressions, cuts, or rack gears, as desired. If desired, in place the detents 28, the pointed end of the pin 22 shown in FIG. 3 can be replaced with a friction material so that location of the paddle 18 is not limited by the location of the detents and the end of the pin 22 contacts the bearing way 20 to lock the paddle 18 in place on the bearing way 20. A cap can also be used, as further described below, which is disposed between the pin 22 and bearing way 20 so that the pin 22 contacts the bearing way 20 through the cap.

Preferably, the paddle 18 and/or the paddle roller magnet bank 32 includes spacing structure to provide space between the paddle 18 and the paddle roller magnet bank 32 so that the paddle 18 does not hang up on the paddle roller magnet bank 32. For example the spacing structure 42, can be a wheel or a low friction surface, such as nylon or graphite, as desired.

A programmable computer controller 50 is preferably used to control the operation of the actuator magnet bank 30, and preferably individual electromagnets on the magnet bank 30. The location of the paddles 18 can be known to the programmable computer controller 50 by calculation of the offset relative to the displacement of the lumber conveyor in the path of lumber travel as measured with an encoding device, at the known angle of the magnet banks. A commercial example of a suitable encoding device is an Electrocam PS4256 absolute grey code encoder. A commercial example of the programmable computer controller 50 is an A.B.ControLogix 5000 series. Any suitable controller 50 can be used.

Figure 4:
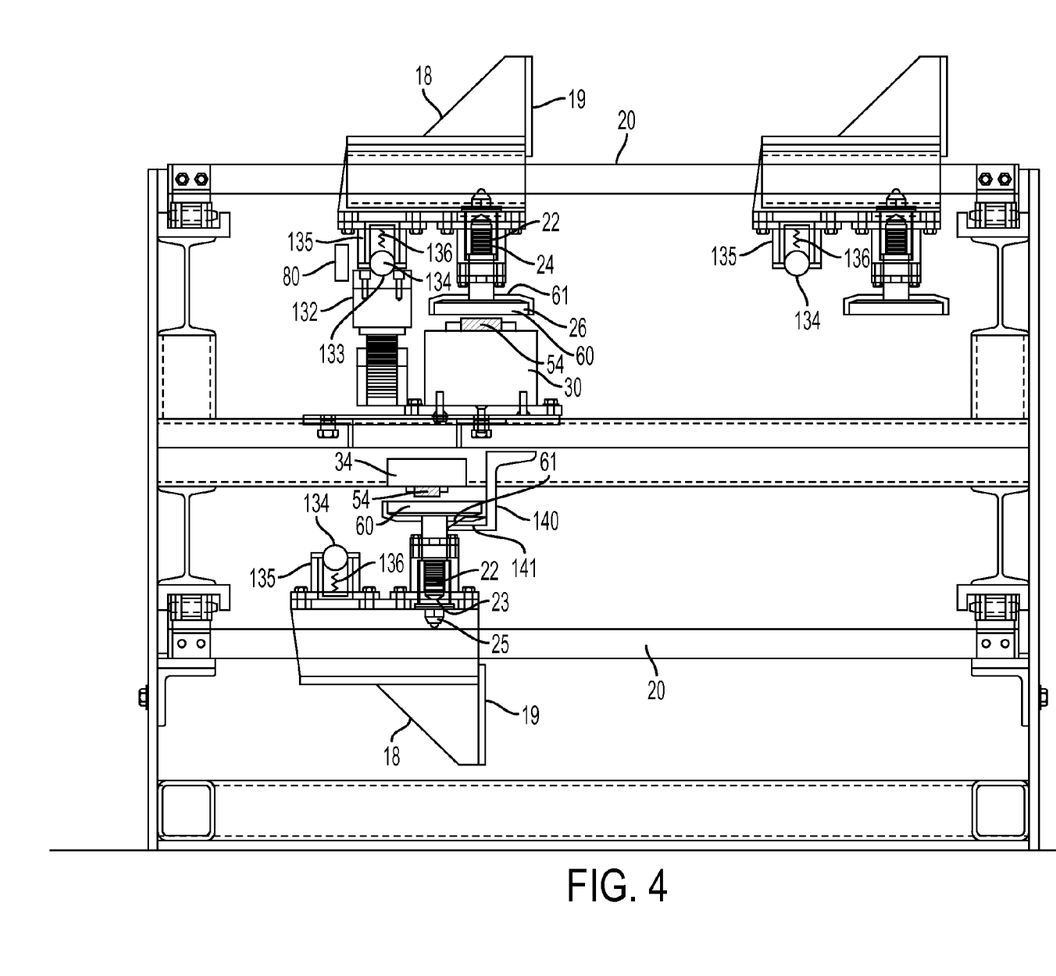
FIG. 4 is a cut away view of a positioning fence.
Figure 5:
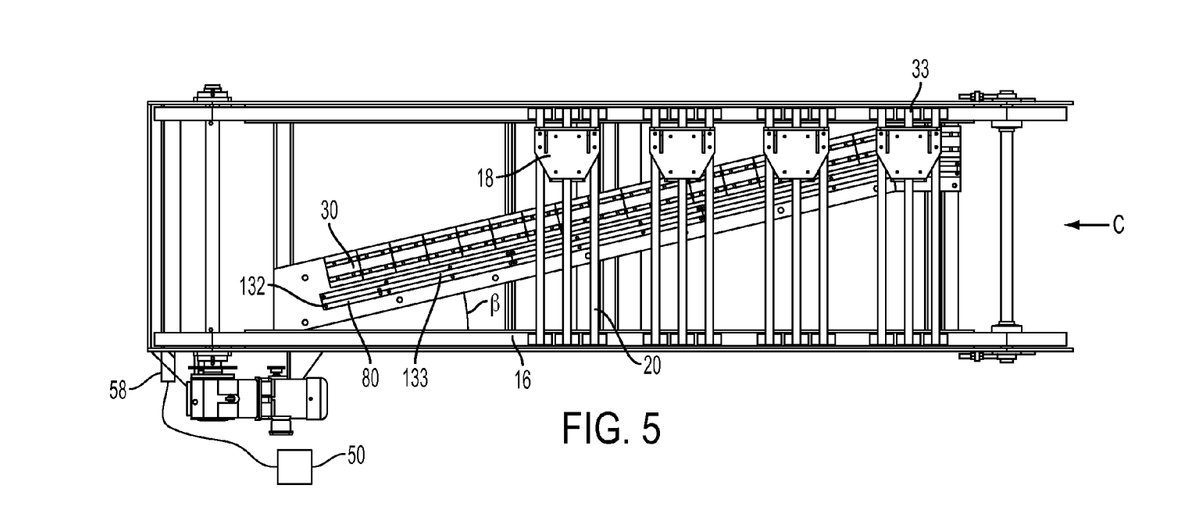
FIG. 5 is a top view of a positioning fence.
Figure 6:
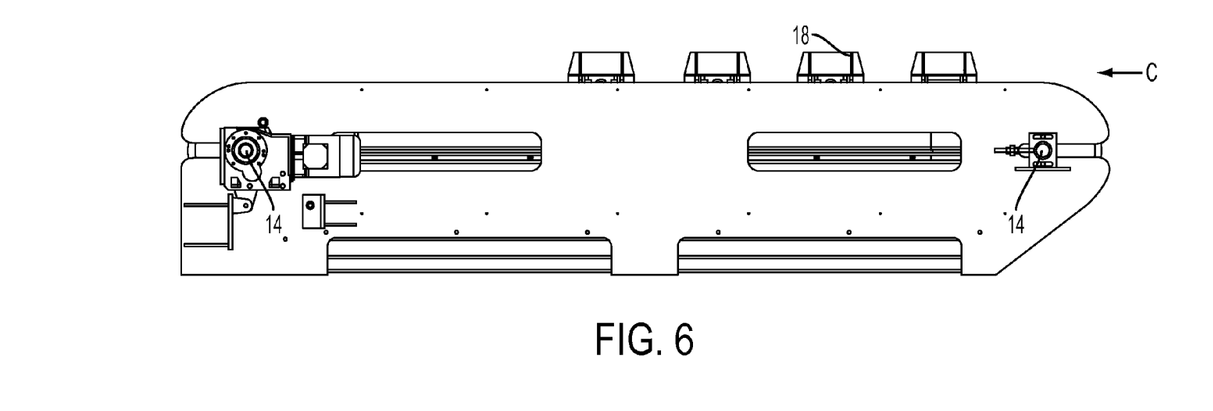
FIG. 6 is a side view of a positioning fence.
Figure 7:
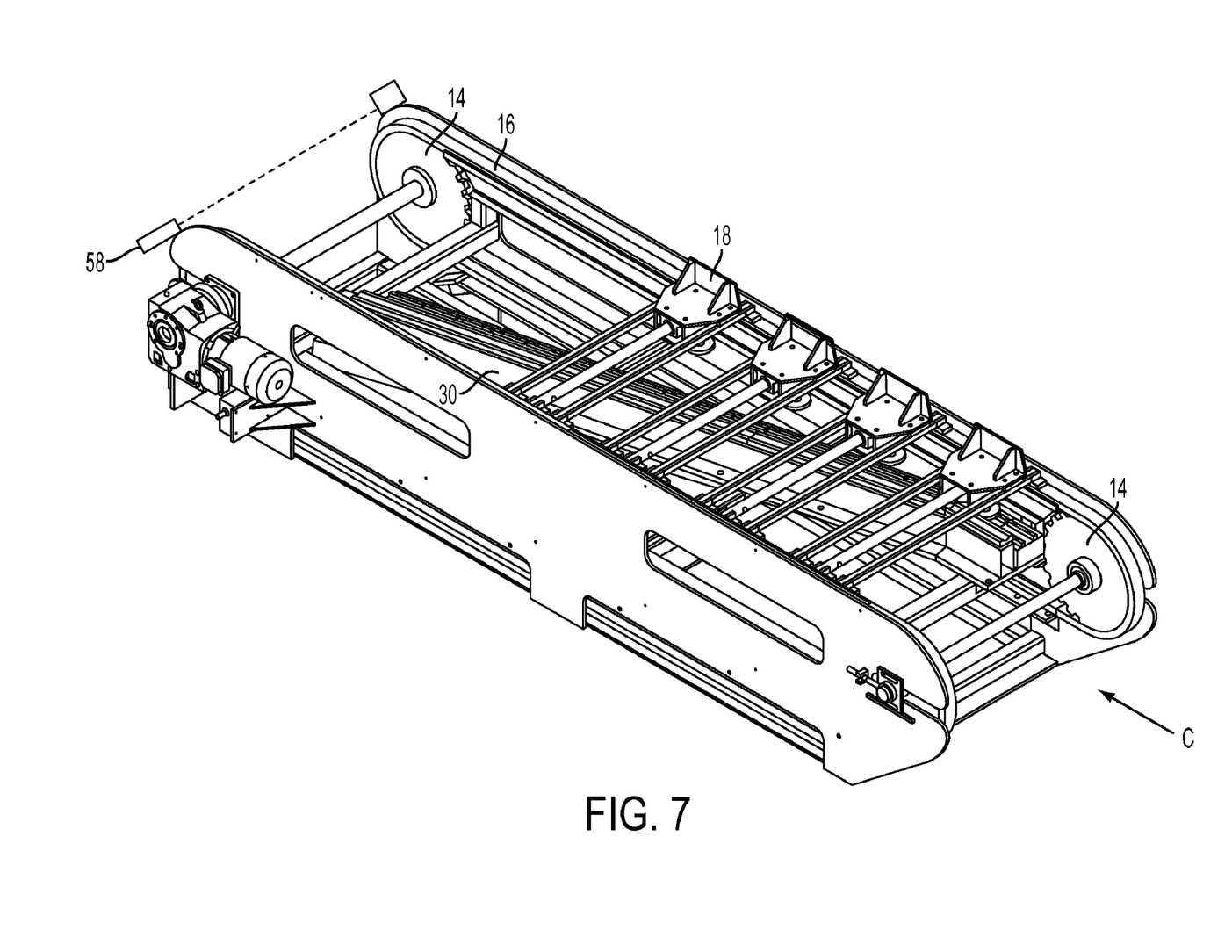
FIG. 7 is an angled view of a positioning fence.
Figure 8:
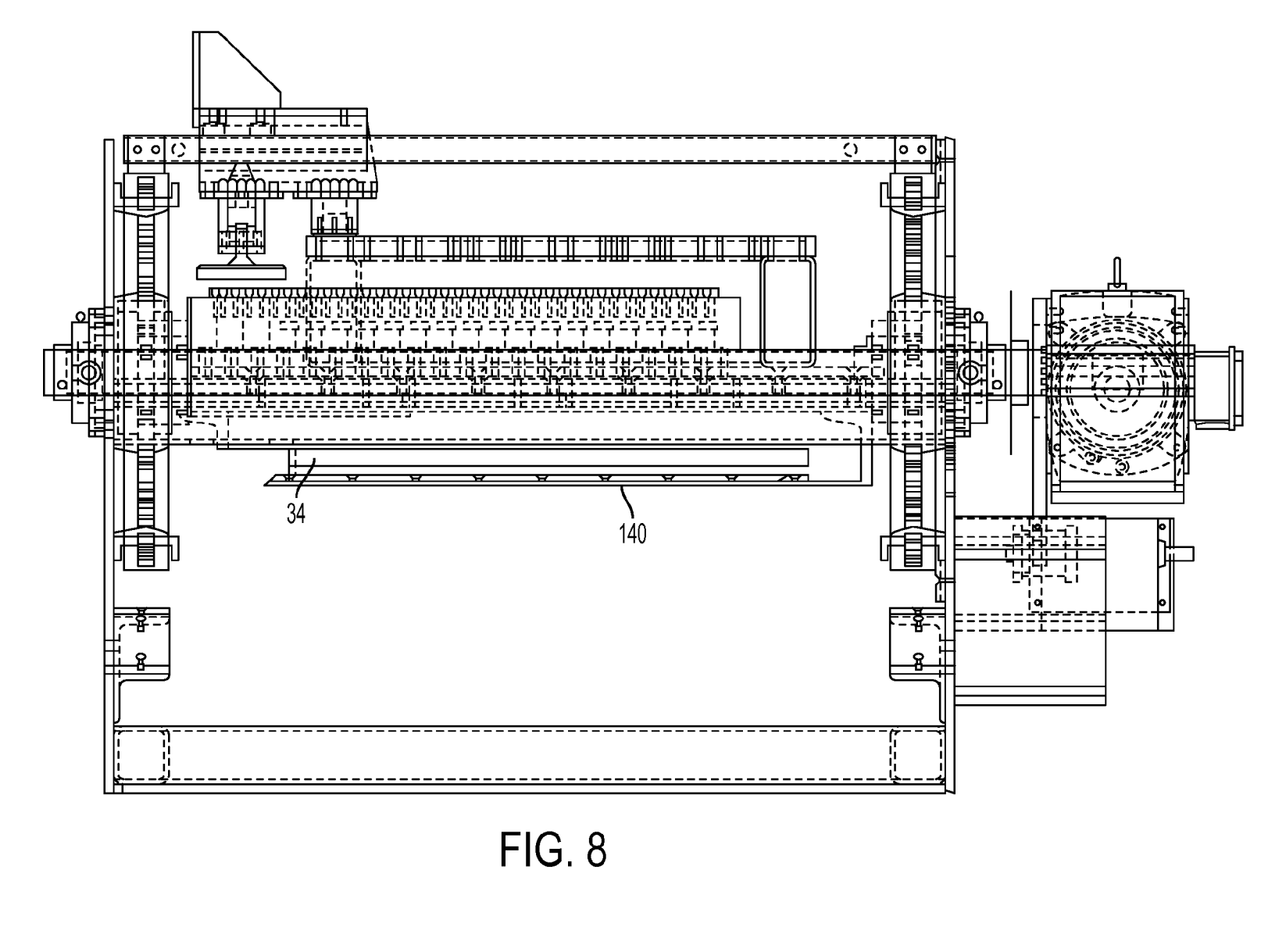
FIG. 8 is an end view of a positioning fence.

FIGS. 4-8 show another embodiment of the lumber positioning fence. Like reference numbers and letters are as described above unless otherwise stated. FIG. 4 is a cut away view through the center of the positioning fence. The positioning fence has a continuous track 16 extending between an opposed set of end rollers 14. The width of the track 16 is generally about 3 feet, but any desired width can be used. The top of the track 16 moves in a right to left direction, as shown by the arrow C in FIGS. 5 and 6. The track 16 includes a plurality of paddles 18 spaced along the continuous track 16 corresponding to the lumber spacing of the individual lumber pieces that the lumber position fence will be used to position. The paddles 18 have a surface 19 for interacting with the lumber pieces.

At least one of the end rollers 14 are driven to cause the track 16 and the paddles 18 to move in a longitudinal direction, that is in the direction of travel of the lumber, which is generally depicted by arrow C. End roller 14 can be driven by and in time with the lumber conveyor or by a separate drive that follows the movement of the lumber coveyor exactly. At least one of the paddles 18 is mounted for lateral sliding movement across the width of the track loop along a bearing way 20. The bearing way 20 is oriented for lateral movement of the paddle 18, which is a direction perpendicular to the longitudinal direction of the track 16.

The paddle 18 has a locking mechanism constructed and arranged to lock the lateral position of the paddle on the bearing way 20. The locking mechanism comprises a movable pin 22 biased in a closed position by a spring 24. The pin 22 has a pad 26 located a second end of the pin 22. The pad 26 has a first surface 60 facing away from the pin 22 that is attracted to a magnetic source and a second surface 61 that faces the pin 22. When the pin 22 is in a closed position, a first end 23 of the pin 22 contacts the bearing way 20 to lock the paddle 18 in position on the bearing way 20. Reference No. 25 shows the pin 22 in a lower position. An optional cap (not shown) can be used between the first end 23 of the pin 22 and the bearing way 20. The cap can be formed from any desired material. If desired, the bearing way 20 can contain detents 28 in which the first end 23 of the pin 22 contacts the bearing way 20. If the optional cap is present, the first end 23 will contact the bearing way 20 through the cap. While the preferred locking mechanism utilizes a pin 22, any desired locking mechanism can be utilized so long as the locking mechanism can be controlled by the actuator magnet bank 30. Examples of other locking mechanisms include clamps or other devices that contact the bearing way 20 in a closed position to lock the paddle 18 in position on the bearing way 20 so that the locking position is infinitely variable.

An actuator magnet bank 30 is disposed at an angle β across the width of the track 16. The actuator magnet bank 30 comprises an electromagnet that can be activated and deactivated. The actuator magnet bank 30 is constructed and arranged such that when activated, the pad 26 is magnetically attracted to the actuator magnet bank 30 and the pin 22 moves to an open position where the first end 23 of the pin 22 does not contact the bearing way 20. When the pin 22 is an open position, the paddle 18 is free to move along the length of the bearing way 20. When the actuator magnet bank 30 is deactivated the first end 23 of the pin 20 contacts the bearing way by the spring 24 to lock the position of the paddle 18 on the bearing way 20.

A paddle roller bank 132 is disposed at an angle β across the width of the track 16. The paddle roller bank 132 comprises a depression 133 which is sized to receive a portion of a roller ball 134. The paddle 18 includes a roller ball 134, a roller ball receiver 135, and a spring 136. The spring 136 biases the roller ball 134 towards the depression 133.

Thus, when the track 16 is moving in the right to left direction shown in FIGS. 4-8, the roller ball 134 travels along the depression 133 and moves the paddle 18 from a starting position shown at 33 along the bearing way 20 while the actuator magnet bank 30 is activated and the pin 22 is in the unlocked position. If the length of the magnet bank 30 is such that more than one paddle 18 will be travelling along the length of the magnet bank 30 at the same time, the magnet bank 30 comprises a plurality of electromagnets and the individual electromagnets can be activated and deactivated at different times to control the position of each paddle 18 independently of one another. When a desired position of the paddle 18 on the bearing way 20 is obtained, the individual electromagnets on the actuator magnet bank 30 controlling the paddle 18 are deactivated and the first end 23 of pin 22 contacts the bearing way 20 and the paddle 18 is locked in position on the bearing way 20, and as the track 16 continues to move the roller ball 134 retracts into the receiver 135 and leaves the depression 133 so that the paddle 18 is pulled away from the paddle roller bank 132 and the paddle 18 continues to move only in the direction of the track 16. The paddle roller bank 132 can contain an optional safety bar 80 that prevents the roller ball 134 from exiting the wrong side of the depression 133.

A paddle reset slide 140 is disposed at an angle φ across the track 16. Preferably, the paddle reset slide 140 is located on a bottom side of the track 16. The paddle reset slide 140 is constructed and arranged to move the paddles 18 back into the starting position 33. The paddle reset slide 140 has a sliding surface 141 that contacts the second surface 61 of the pad 26. When the second surface 61 slides onto the sliding surface 141 as the track 16 moves the pad 26 is pulled in a direction away from the paddle 18, thus moving the pin 22 away from the bearing way and unlocking the paddle 18. The second surface 61 slides along the surface 141 as the track 16 moves to move the paddle 18 back to a starting position 33. Once the paddle 18 reaches the starting position 33 the second surface 61 exits the sliding surface 141 and the first end 23 of the pin 22 contacts the bearing way 20 locking the paddle 18 in the starting position on the bearing way 20. The pin 22 can rotate within the paddle 18, thus allowing the surface 61 to rotate as it slides along the sliding surface 141 thereby increasing wearability and life of the pad 26. The sliding surface 141 and the surface 61 are preferably formed from a low friction material, such as plastic.

An example of the apparatus was tested. It was found that occasionally the pad 26 would come into contact with the magnet bank 30 when the pad 26 was pulled down too far by the magnet bank 30 during operation. Thus, preferably a slide bar 54, such as UHMW plastic, is placed on the magnet bank 30 in a position so that if the pad 26 is pulled too far by the magnet bank 30 the pad 26 contacts the slide bar 54 and not the magnet bank 30.

Figure 9:
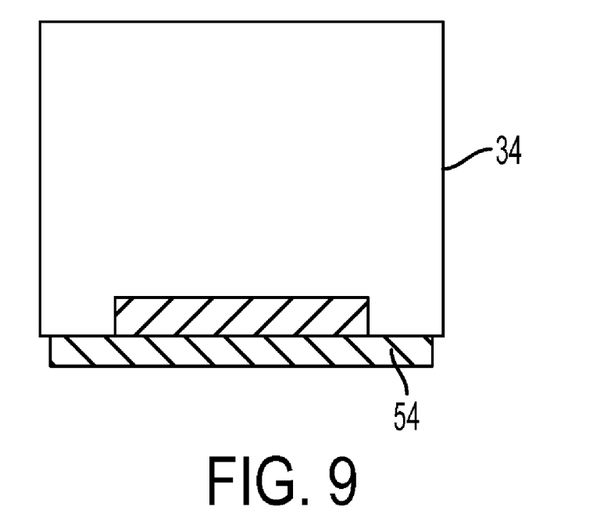
FIG. 9 is an end view of a permanent magnet bank.
Figure 10:
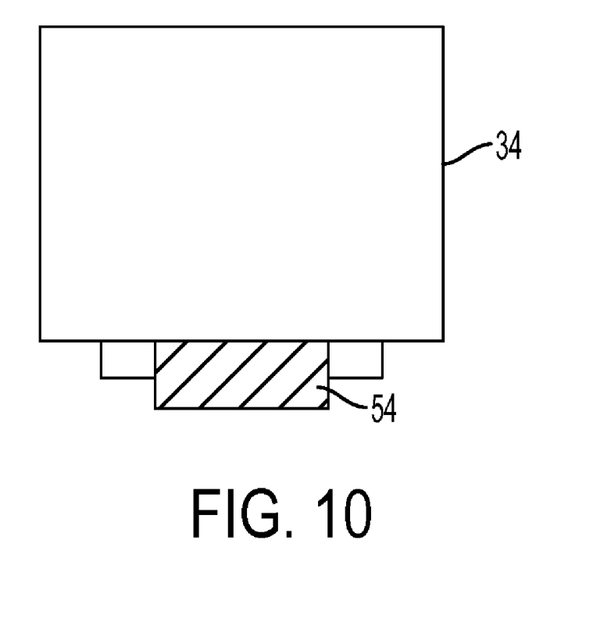
FIG. 10 is an end view of an electromagnet bank.

It was also found that premature pin 22 wear can sometimes occur. Without being limited to any cause, it is believed that the pin 22 wear is from the paddle reset slide 140 where the pin 22 is pulled out of the detent hole 28 with the reset slide angle 140 and pushing the pin 22 over somewhat at the same time. To solve this problem a long magnet or shorter series of magnets can be placed the entire length of the paddle reset slide and located just out in front of the paddle reset slide 140. The magnet can pull the pin 22 before hitting the return angle 140 and the pin 22 should be all the way out of the detent hole 28 before having to be pushed back to the zero position. Even though a permanent or earth magnet would work, as shown in FIG. 9, preferably an electromagnet, as shown in FIG. 10, is utilized so that when the electromagnet is turned off when it is not being used, the magnet can be cleared of any metallic debris the magnet may attract. FIG. 9 illustrates permanent magnets embedded in an aluminum block, and slide bar 54. The permanent magnet does not have to be embedded, and if the permanent magnet is embedded, any suitable material can be used. An example of a suitable magnet structure is the paddle reset slide 34 described herein above. The paddle reset slide 34 can be used in place of the paddle reset slide 140 or in combination with the paddle reset slide 140. FIG. 4 shows the paddle reset slide 34, in the form of a magnet bank with optional slide bar 54, as shown in FIGS. 9 and 10, used in combination with the paddle reset slide 140. In this manner, if the magnet in the paddle reset slide 34 does not fully disengage the pin 22 from the detent hole 28, the paddle reset slide 140 will ensure that the pin 22 is fully removed from the detent hole 28. Alternatively, the paddle reset slide 34 can be used in combination with a slide bar, which comprises the vertical wall shown as part of the paddle reset slide 140 in FIG. 4.

An example of the apparatus having seventeen paddles 18 was tested. It was found that the paddles 18 all acted a little differently. Each paddle 18 tested had forty nine set points (defined by detents 28), along 0" to 24" on 0.5" increments, which is a total of 833 (49×17) individual set points. Thus, seventeen individual timing tables with individual encoder counts for each set point were set up. In addition to that, the paddle 18 timing points appeared to change with temperature, wear and other unknown factors. Timing of the paddles 18 would be a tedious task to do manually and cannot be done while the paddles 18 are in the operational mode. To correct for these changes, an auto-timing feature was added. With the addition of a paddle position sensor 58, such as a laser sensor, located on the out-feed side of the track 16 and connected to the controller 50, the exact location of the paddle 18 can be determined. The exact location of the paddle 18 can then be compared to the set point that the paddle 18 should have gone to. Knowing the difference (+/−) between the actual location and the set point, the controller can automatically adjust the individual encoder counts for that individual set point within that individual table to correct for the inaccuracy or miss-set of the paddle 18. This adjustability is also useful when setting up the paddle 18 as it will time itself rather than having to spend several hours doing it manually.

The temperature of the magnet 30 may be a concern. The magnet 30 should not be run too hot nor too cool. The timing seems to change with magnet temperature. Thus, an auto-temp feature is preferably included with the addition of thermocouple(s) 56 connected to the controller 50. Preferably, each electro magnet 30 has an associated thermocouple 56 for measuring the temperature of the magnet 30. Since the magnet 30 cools off when not in use, the control can automatically turn the magnet 30 on early to reach the desired running temperature or even hold the magnet 30 at that temperature overnight if desired. While not required, knowing the magnet temperature seems to be beneficial in making the apparatus function better.

The invention also relates to a method of locating a piece of lumber on a conveyor that is transporting the lumber with one end of the lumber contacting the surface 19 of the paddle 18. During use, a piece of lumber being transported on the conveyor is urged toward the paddle 18 traveling on track 16. The paddle 18 prevents further movement of the lumber in a direction perpendicular to the travel of the track 16 when the locking mechanism is switched to a closed position which locks the paddle 18 in place on the bearing way 20. The track 16 continues to move separating the paddle 18 from the paddle roller bank 32 or 132 by continuing to move the track 16 while the paddle 18 is in a locked position on the bearing way 20 so that the lumber only travels in the direction of the track. Once the lumber is in a desired position, it will continue to be transferred downstream to a trimmer where the lumber can be cut to size. After the lumber has exited the track, the paddle 18 is returned to a starting position 33.

While the claimed invention has been described in detail and with reference to specific embodiments thereof, it will be apparent to one of ordinary skill in the art that various changes and modifications can be made to the claimed invention without departing from the sprit and scope thereof.

We claim:

1. An apparatus for positioning a lumber piece comprising:
   a continuous track loop;
   a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber in a desired position perpendicular to a longitudinal direction of the track loop during use;
   the at least one paddle having a locking mechanism constructed and arranged to lock the lateral position of the at least one paddle on the bearing way, the locking mechanism being biased in a closed position and being constructed such that when the locking mechanism is in a closed position the paddle is locked in position on the bearing way;
   an actuator disposed at an angle across the width of the track, the actuator constructed and arranged such that when activated the locking mechanism is in an open position and the paddle is free to move along the length of the bearing way and when the actuator is deactivated the locking mechanism locks the position of the paddle on the bearing way; and
   a paddle roller bank disposed at an angle across the width of the track, the paddle and paddle roller bank constructed and arranged so that as the track moves during operation and the locking mechanism is in an open position the paddle moves in the direction of the track and along the paddle roller bank which moves the paddle in a direction along the bearing way from a starting position to a desired position on the bearing way, and when the actuator is deactivated the locking mechanism goes to a closed position and the paddle is in a locked position on the bearing way and movement of the track pulls the paddle away from the paddle roller bank so that the paddle then moves only in the direction of the track.

2. The apparatus according to claim 1, further comprising a paddle reset slide constructed and arranged to move the paddle back to the starting position during operation of the continuous track loop.

3. The apparatus according to claim 1, wherein the actuator comprises an electromagnet.

4. The apparatus according to claim 3, further comprising a programmable computer controller to control the operation of the actuator.

5. An apparatus for positioning a lumber piece comprising:
a continuous track loop;
a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of a lumber piece and stopping the lumber in a desired position perpendicular to a longitudinal direction of the track loop during use;
the at least one paddle having a locking mechanism constructed and arranged to lock the lateral position of the at least one paddle on the bearing way, the locking mechanism comprising a movable pin biased in a closed position where a first end of the pin is against the bearing way, the pin having a pad disposed at a second end of the pin, a first surface of the pad facing away from the pin and a second surface of the pad facing the pin;
an actuator magnet bank disposed at an angle across the width of the track, the actuator magnet bank constructed and arranged such that when activated the pad on the pin is attracted to the actuator magnet bank and the pin is moved into an open position where the first end of the pin is not against the bearing way and the paddle is free to move along the length of the bearing way and when the actuator magnet bank is deactivated the first end of the pin is against the bearing way to lock the position of the paddle on the bearing way; and
a paddle roller bank disposed at an angle across the width of the track, the paddle roller bank comprising a depression constructed to receive a portion of a roller ball, the paddle having a roller ball receiver containing a roller ball biased in a direction towards the depression, a portion of the roller ball disposed within the depression so that as the track moves during operation the paddle moves in the direction of the track and in the direction of the bearing way as the roller ball travels along a length of the paddle roller bank which moves the paddle from a starting position on the bearing way to a desired position on the bearing way, and when the locking mechanism is moved to a closed position, the paddle is locked, and movement of the track forces the ball to retract into roller ball receiver so that the roller ball leaves the depression and the paddle then moves only in the direction of the track.

6. The apparatus according to claim 5, further comprising a paddle reset slide constructed and arranged to move the paddle back to the starting position during operation of the continuous track loop.

7. The apparatus according to claim 6, wherein the paddle reset slide is disposed at an angle across the track, the paddle reset slide comprising a sliding surface that contacts the second surface of the pin and constructed such that when the track is moving the second surface of the pad contacts the sliding surface, the pad slides onto the sliding surface and lifts the pin away from the bearing surface so that the locking mechanism is disengaged, the pad slides along the paddle reset slide moving the paddle back into the starting position.

8. The apparatus according to claim 7, wherein the pin and pad are constructed to freely spin within the paddle so that during operation the second surface of the pin can spin as it also slides on the sliding surface.

9. The apparatus according to claim 5, wherein the roller ball is biased using a spring.

10. The apparatus according to claim 5, wherein the actuator magnet bank comprises an electromagnet.

11. The apparatus according to claim 10, further comprising a programmable computer controller to control the operation of the actuator magnet bank.

12. The apparatus according to claim 5, wherein the actuator magnet bank comprising a plurality of individual electromagnets that can be individually activated and deactivated independently of one another.

13. The apparatus according to claim 11, further comprising a thermocouple associated with the actuator magnet bank so that during operation the controller can account for changes in temperature of the actuator magnet bank.

14. The apparatus according to claim 11, further comprising a paddle position sensor connected to the controller and located to determine the actual position of the paddles after being moved by the paddle roller bank, so that the controller can compare an actual location of a paddle to a set point position of the paddle.

15. The apparatus of claim 5, further comprising a slide bar located on the actuator magnet bank so that when the pad is pulled too far toward the actuator magnet bank during operation the pad will contact the slide bar and not the actuator magnet bank.

16. The apparatus of claim 6, wherein the paddle reset slide comprises a return magnet bank such that during operation the return magnet bank pulls the pin.

17. An apparatus for positioning a lumber piece comprising:
a continuous track loop;
a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of a lumber piece and stopping the lumber in a desired position perpendicular to a longitudinal direction of the track loop during use;
the at least one paddle having a locking mechanism constructed and arranged to lock the lateral position of the at least one paddle on the bearing way, the locking mechanism comprising a movable pin biased in a closed position, the pin having a first end that contacts the bearing way when in the closed position and a pad disposed at a second end of the pin;
an actuator magnet bank disposed at an angle across the width of the track, the actuator magnet bank constructed and arranged such that when activated the pad on the pin is attracted to the actuator magnet bank and the pin is moved into an open position where the first end of the pin does not contact the bearing way and the paddle is free to move along the length of the bearing way and when the actuator magnet bank is deactivated the first end of the pin contacts the bearing way to lock the position of the paddle on the bearing way; and a paddle roller magnet bank disposed at an angle across the width of the track, the paddle having a surface that is magnetically attracted to the paddle roller magnet bank so that as the track moves during operation the surface of the paddle is magnetically bound to the paddle roller magnet bank and travels along the paddle roller magnet bank which moves the paddle moves from a starting position to a desired position on the bearing way, and when the pin is moved to a closed position, the paddle is locked, and movement of the track overtakes the magnetic force between the paddle roller magnet bank and the surface of the paddle so that the paddle then moves only in the direction of the track.

18. The apparatus according to claim 17, wherein the actuator magnet bank comprises a plurality of individual electromagnets that can be deactivated and activated independent of one another.

19. The apparatus according to claim 17, wherein the bearing way having a plurality of detents along a length of the bearing way sized to receive the first end of the pin in the closed position.

20. The apparatus of claim 17, wherein the pin is biased in a closed position by a spring.

21. The apparatus of claim 17, further including a reset guide track constructed and arranged to move the paddle back to the starting position during operation of the continuous track loop.

22. The apparatus of claim 1, wherein the reset guide track comprising a magnet bank.

23. The apparatus of claim 17, wherein the paddle roller magnet bank comprises an electromagnet.

24. The apparatus of claim 17, wherein the paddle roller magnet bank comprises a permanent magnet.

25. The apparatus of claim 17, further comprising a programmable computer controller to control the operation of the actuator magnet bank.

26. The apparatus of claim 17, further comprising spacing structure to provide space between the paddle and the paddle roller magnet bank.

27. A method of positioning a lumber piece traveling on a conveyor comprising:
a continuous track loop;
a plurality of paddles spacedly disposed along the length of the continuous track loop, at least one paddle slideably mounted along a bearing way coupled to the track loop so that the paddle is laterally displaceable across a width of the track loop, and wherein the paddle comprises a lumber surface for contacting a surface of the lumber piece and stopping the lumber in a desired position perpendicular to a longitudinal direction of the track loop;

the at least one paddle having a locking mechanism constructed and arranged to lock the lateral position of the at least one paddle on the bearing way, the locking mechanism being biased in a closed position and being constructed such that when the locking mechanism is in a closed position the paddle is locked in position on the bearing way;

an actuator disposed at an angle across the width of the track, the actuator constructed and arranged such that when activated the locking mechanism is in an open position and the paddle is free to move along the length of the bearing way and when the actuator is deactivated the locking mechanism locks the position of the paddle on the bearing way; and a paddle roller bank disposed at an angle across the width of the track, the paddle and paddle roller bank constructed and arranged so that as the track moves during operation and the locking mechanism is in an open position the paddle moves in the direction of the track and along the paddle roller bank which moves the paddle in a direction along the bearing way from a starting position to a desired position on the bearing way, and when the actuator is deactivated the locking mechanism goes to a closed position and the paddle is in a locked position on the bearing way and movement of the track pulls the paddle away from the paddle roller track so that the paddle then moves only in the direction of the track, the method comprising:

transporting a piece of lumber with the lumber contacting the paddle; moving the lumber in a direction perpendicular to the travel of the track until a desired position of the lumber is reached;

switching the locking mechanism to a closed position when the desired position of the lumber is reached which locks the paddle in place on the bearing way and stops further movement of the lumber in the direction perpendicular to the travel of the track;

separating the paddle from the paddle roller bank by continuing to move the track while the paddle is in a locked position on the bearing way so that the lumber only travels in the direction of the track; and returning the paddle to a starting position.

28. The method according to claim 27, wherein the actuator comprises an electromagnet bank.

29. The method according to claim 28, wherein the a paddle roller bank comprises a depression constructed to receive a portion of a roller ball, the paddle having a roller ball receiver containing a roller ball biased in a direction towards the depression, a portion of the roller ball disposed within the depression so that as the track moves during operation the paddle moves in the direction of the track and in the direction of the bearing way as the roller ball travels along a length of the paddle roller bank which moves the paddle from a starting position on the bearing way to a desired position on the bearing way, and when the locking mechanism is moved to a closed position, the paddle is locked, and movement of the track forces the ball to retract into roller ball receiver so that the roller ball leaves the depression and the paddle then moves only in the direction of the track.

* * * * *